Jan. 2, 1940.  R. S. SANFORD  2,185,273
VACUUM CLUTCH CONTROL
Filed July 22, 1935  2 Sheets-Sheet 1

INVENTOR.
ROY S. SANFORD
BY H. O. Clayton
ATTORNEY

Jan. 2, 1940.   R. S. SANFORD   2,185,273
VACUUM CLUTCH CONTROL
Filed July 22, 1935   2 Sheets-Sheet 2
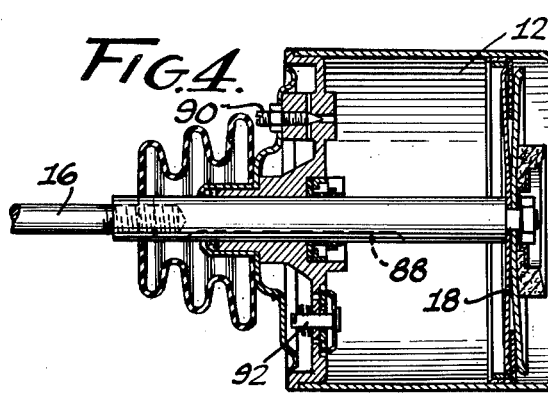
INVENTOR.
ROY S. SANFORD
BY
ATTORNEY Patented Jan. 2, 1940

2,185,273

UNITED STATES PATENT OFFICE 2,185,273

VACUUM CLUTCH CONTROL

Roy S. Sanford, New York, N. Y., assignor to Bragg-Kliesrath Corporation, South Bend, Ind., a corporation of New York Application July 22, 1935, Serial No. 32,552

2 Claims. (Cl. 192—.01)

This invention relates in general to control mechanism for automotive vehicles, and in particular to a power operated clutch mechanism rendered operable by and in conjunction with the throttle control mechanism of the vehicle.

It has been proposed to operate the control valve of a clutch power actuator by the accelerator or throttle control mechanism. Such a structure is disclosed in the patent to Belcia No 1,470,272, dated October 9, 1923. This mode of operation, however, makes no provision for the timing of the clutch engagement with respect to the relative R. P. M.'s of the driving and driven clutch plates. It is, of course, desirable to effect the engagement of the clutch plates with a minimum of slipping and grabbing, and such an engagement is had when the engine is speeded up so that the R. P. M. of the driving clutch plate is equal to or substantially equal to that of the driven plate. Accordingly, an object of the invention is to provide common means for conjoint operation of the throttle and clutch, which means permits of a control to insure non-slipping and non-grabbing clutch engagement at all speeds of the vehicle.

In one desirable arrangement, the butterfly valve of the carburetor is so connected to the accelerator pedal as to permit positive operation of the butterfly to accelerate the engine with either clockwise or counterclockwise rotation of the pedal, and such a structure is so interconnected with the control valve of the power actuator for the clutch as to effect the clutch engagement only when the pedal is actuated in normal fashion, that is in the clockwise direction. Such a structure permits of a speeding up of the negine, while the vehicle is in motion and declutched, to thus increase the R. P. M. of the driving clutch plate to equal that of the driven plate, the subsequent normal accelerating movement effecting the desired clutch engagement and a continued throttle opening.

The instant invention is in part a continuation of my application No. 551,956, filed July 20, 1931, now matured into Patent No. 2,008,727, dated July 23, 1935, said application being improved by the addition of mechanism to fully insure a simulation of a normal manual operation of the clutch. To this end the power means is provided with valvular mechanism for insuring a so-called two-stage engagement of the clutch upon depression of the accelerator pedal, that is a relatively fast movement of the driven clutch plate up to a point just prior to actual engagement with the driving clutch plate, thereafter the movement of the driven clutch plate being relatively slow. Such a two-stage engagement effects a smooth start of the vehicle.

As a further addition to the aforementioned application there is incorporated in the instant disclosure a lost motion connection between the accelerator rod and butterfly or throttle valve, whereby the power means for controlling the engagement and disengagement of the clutch is initiated as to its operation to disengage the clutch after the butterfly or throttle valve is completely closed and initiated in its operation to engage the clutch prior to an opening of the butterfly or throttle valve.

Other objects of the invention and desirable details of construction and combinations of parts will become apparent from the following detailed description of a preferred embodiment of the invention, which description is taken in conjunction with the accompanying drawings, in which:

Figure 4 is an enlarged sectional view of the pressure differential operated motor disclosed in Figure 1.

Figure 1:
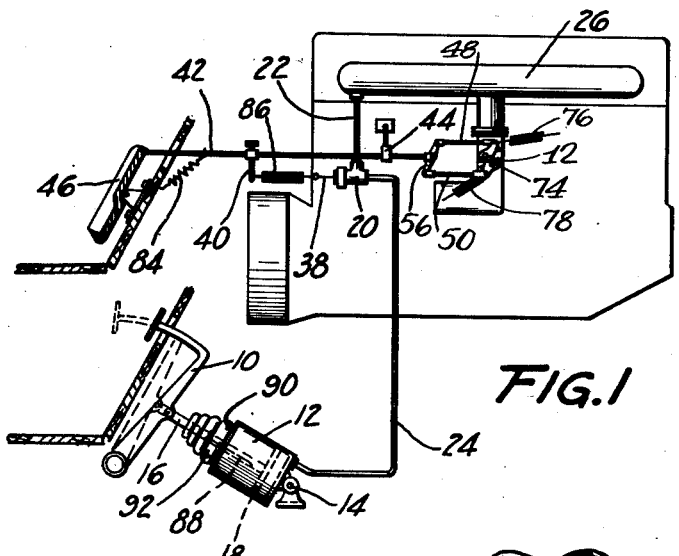
Figure 1 is a diagrammatic view of the clutch and throttle control mechanism constituting a preferred embodiment of my invention.

In that embodiment of the invention disclosed in Figure 1 there is provided a conventional clutch pedal 10 for operation of a conventional clutch mechanism, not shown. A fluid motor or power actuator is adapted to control the rotation of the clutch pedal to effect the engagement and disengagement of the clutch plates. The actuator preferably comprises a cylinder 12 pivotally secured at 14 to a fixed portion of the chassis, the connecting rod 16 of the piston 18 being pivotally secured to the clutch pedal intermediate its ends. The actuator is adapted to be energized to impart a declutching movement of the pedal by virtue of its connection, via control valve 20 and conduits 22 and 24, to the intake manifold 26 of the internal-combustion engine of the vehicle, which at closed throttle provides a pumping action of the engine pistons inducing a vacuum in the manifold and likewise in the actuator to thereby impose an atmospheric load on the piston 18 and effect the desired declutching operation.

Figure 3:
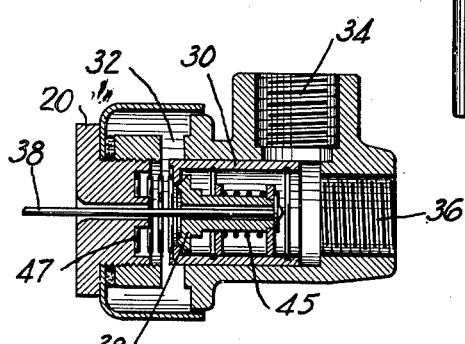
Figure 3 is an enlarged sectional view of the three-way control valve for the clutch operating power actuator.

The control valve for the actuator is shown in detail in Figure 3 and briefly comprises spring pressed atmospheric and vacuum valve members 28 and 30 controlling atmospheric, vacuum and outlet ports 32, 34 and 36, respectively, to render the valve operative for the purposes intended. This particular valve structure forms no part of the present invention, being fully disclosed, described and claimed in Victor W. Kliesrath Patent No. 2,036,053, dated March 31, 1936.

The valve is operated to place the actuator alternately in communication with the manifold to disengage the clutch and with the atmosphere to permit clutch engagement by means of a link 38, which is yieldably connected to a short link 40, the latter being adjustably connected to a link 42 supported by bracket 44. The link 42 serves to interconnect an accelerator pedal 46 with the lost motion or two-direction throttle operating linkage described in detail hereinafter.

In the off position of the parts, as disclosed in full lines in Figure 1, the accelerator pedal is in its neutral position, the throttle being closed to its engine idling position and the atmospheric and vacuum valve members closed and opened respectively by compressed springs 45 and 47, Figure 3, to place the actuator in circuit with the manifold to evacuate the actuator and maintain the clutch plates disengaged.

The invention is particularly concerned, however, with means for the actuation of the throttle with either counterclockwise or clockwise movement of the accelerator pedal without, however, effecting an operation of the three-way valve 20 to effect clutch engagement during counterclockwise pedal movement.

Figure 2:
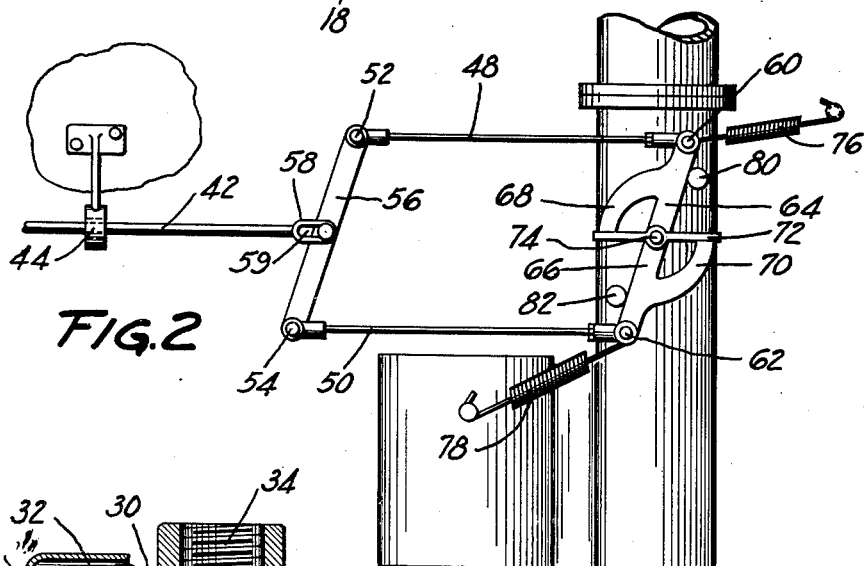
Figure 2 is an enlarged view of the two-direction throttle control mechanism.

Accordingly, with this end in view, there is disclosed the two-directional control mechanism, disclosed in detail in Figure 2, comprising links 48 and 50 pivotally connected at 52 and 54 to a bar 56, the latter being connected intermediate its ends to the accelerator operated link 42 by a lost motion connection 58, the latter comprising a slot 59. The links 48 and 50 are preferably adjustably and pivotally connected at 60 and 62 to relatively movable lever members 64 and 66, respectively, each of said members being adapted, by virtue of curved arm portions 68 and 70, to rotate a butterfly valve operating member 72 counterclockwise to open the throttle. The lever members, together with the butterfly valve operating member, are rotatably mounted on a common shaft 74. In the closed throttle position of the aforementioned parts tensioned springs 76 and 78 urge the lever members against stops 80 and 82, and a coiled spring, not shown, returns the butterfly valve operating member to its closed or idling engine position. A spring 84 serves to maintain the accelerator pedal in its neutral position when the operator's foot is removed from the pedal and likewise serves to tension a spring 86 to compress springs 45 and 47 to maintain the valve 20 open to vacuum.

In operation, clockwise actuation of the accelerator pedal in a conventional manner serves, first, to permit an operation of the valve 20 by the springs 45 and 47 to interconnect the clutch motor with the atmosphere and initiate an engagement of the clutch, this operation of the valve being effected by virtue of the lost motion connection 58. The engagement of the clutch is effected in two distinct stages of movement, the first stage being relatively fast by virtue of a relatively rapid egress of air from the double-ended clutch motor 12 via a slot 88 in the connecting rod 16, this first stage of movement terminating just short of actual contact of the clutch plates. The relatively slow clutch plate contacting phase of the engagement is effected by the bleed of air from the clutch motor via a valve 90. A one-way valve 92 permits a movement of the piston 18 to disengage the clutch. The clutch engaging operation of the clutch motor is thus initiated with the initial increment of movement of the accelerator. Further movement of the accelerator serves to place the link 42 in compression, the bar 56 being rotated counterclockwise, fulcruming at 52 by virtue of the contact of the lever member 64 against the stop 80. The link 50 is thus placed in compression, rocking the connected lever member 66 counterclockwise, opening the throttle to admit additional volatilized fuel and accelerate the engine.

With release of the accelerator to close the throttle, the clutch is automatically disengaged by the venting operation of the valve 20 after the throttle is closed, the lost motion connection 58 again effecting this function. A free-wheeling operation of the vehicle is thus provided, the clutch being automatically disengaged with each closing of the throttle.

It is desirable, however, to time the engagement of the clutch so that the plates will engage without either grabbing or slipping. This is particularly desirable with the vehicle free-wheeling or coasting at high speeds or during a gear-changing operation, at which time the engine speed should be increased to synchronize with the vehicle speed so that the R. P. M.'s of the driving and driven clutch plates are equal or substantially equal. The efficacy of the present invention will at once become apparent, for at such speeds it is merely necessary to depress the accelerator pedal with the heel of the foot to thereby rotate the pedal counterclockwise and place the link 48 in tension. The bar 56 will then fulcrum at 54, the lever member 66 abutting stop 82, and the rotating bar will actuate link 48 and lever member 64 counterclockwise to again open the throttle.

However, the placing of links 42 and 48 in tension merely further tensions spring 86, Figure 1, and further compresses valve springs 45 and 47, the valve 20 continuing to maintain the actuator in circuit with the manifold to keep the clutch disengaged. The heel operation of the pedal thus provides a means for speeding up the engine without engaging the clutch, and when the operator estimates the engine speed to be sufficiently high to correspond with the vehicle speed he then quickly reverses the operation of the pedal, depressing the same with the toe. This permits the clutch to engage in the manner described and also permits of a continued opening of the throttle to maintain or increase the vehicle speed.

The momentary release of the pedal to return to its dead center or neutral position and the subsequent toe operation to again open the throttle and vent the valve cause a certain loss of time in the control of the vehicle and a slight slowing down of the engine. However, the inertia of the moving engine parts tends to reduce the effect of this momentary throttle closing to a minimum and with practice the operator becomes skilled in this particular invention.

As previously stated, this control is particularly advantageous with the vehicle free-wheeling at high speeds. However, it will be apparent that this mode of control may also be employed at any time during the operation of the vehicle while the same is in motion; accordingly, the clutch engagement may be controlled during the low to intermediate and intermediate to high gear shifting operations. The described mechanism is also advantageous in cold weather, for the motor may be speeded up to warm the engine without, however, unnecessarily operating the clutch.

There is thus provided a clutch operating power mechanism for accurately simulating a conventional manual operation of the clutch under all conditions of operation, for in starting the vehicle the two-stage engagement of the clutch slips the same into engagement to effect a smooth start of the vehicle, and with the vehicle in motion, after a free-wheeling operation or during a change-speed operation of the transmission, the engine speed may be brought up to propeller shaft speed prior to initiating an engagement of the clutch. Such action also insures a smooth engagement of the clutch.

While one illustrative embodiment has been described, it is not my intention to limit the scope of the invention to that particular embodiment, or otherwise than by the terms of the appended claims.

I claim:

1. In an automotive vehicle provided with a throttle and an accelerator pedal, linkage interconnecting said throttle and pedal including a lost motion connection, said linkage further including alternately movable links operable by said pedal for actuating the butterfly valve member of said throttle, said links being bodily movable in opposite directions.

2. In an automotive vehicle provided with a clutch, an engine throttle, power means for operating the clutch, a control valve for said power means, a manually operable control means, means interconnecting said manually operable means, control valve and throttle including a lost motion connection for insuring an operation of said valve prior to an opening of the throttle and a closing of the throttle prior to a subsequent operation of said valve, said interconnecting means further comprising means for effecting a-conjoint operation of the throttle and valve, and further comprising means for operating the throttle independently of said control valve whereby the relative timing of the operation of the power means and the acceleration of the engine may be controlled at the will of the driver.

ROY S. SANFORD.